3,139,442
OPTICALLY ACTIVE GRIGNARD-TYPE COMPOUNDS AND THEIR PREPARATION

Bernard Rudner, Pittsburgh, and Richard A. Bafford, Delmont, Pa., assignors to Koppers Company, Inc., a corporation of Delaware
No Drawing. Filed Aug. 22, 1962, Ser. No. 218,566
14 Claims. (Cl. 260—345.5)

This invention relates to chemical reagents having optical activity. In one specific aspect, it relates to new optically active Grignard-type compounds and to a novel method of preparing such compounds.

Grignard reagents, normally prepared in an organic ether from an organic halide, RX, and magnesium, have been shown to have the structure of a solvated complex of $R_2Mg \cdot MgX_2$, in which there is no exchange between magnesium atoms. For historical reasons the reagent is generally written, or referred to, as RMgX, even though this formula was found to be incorrect by, among others, Wotiz et al., J. Am. Chem. Soc. 79, 3476 (1957). Wotiz et al. proved that normal Grignard reagents, i.e. the one generally called ethylmagnesium bromide (existing as a solvate, possibly a polymeric form of $$(C_2H_5)_2Mg \cdot MgBr_2)$$

shows practically no exchange between the two atoms of magnesium. Therefore, the generally accepted equilibrium reaction:

(1) $\quad (C_2H_5)_2Mg \cdot MgBr_2 \rightleftharpoons 2C_2H_5MgBr$ is, in fact, practically non-existant, while the actual equilibrium involved is, in its simplest form:

(2) $\quad (C_2H_5)_2Mg \cdot MgBr_2 \rightleftharpoons (C_2H_5)_2Mg + MgBr_2$

It is possible to prepare compounds of the formula RMgX by treating $R_2Mg \cdot MgX_2$ with one equivalent of HX or $X_2$:

(3) $\quad R_2Mg \cdot MgX_2 \overset{HX}{\rightleftharpoons} RH + RMgX + MgX_2$ or (4) $\quad R_2Mg \cdot MgX_2 + X_2 \rightleftharpoons RX + RMgX + MgX_2$ Such compounds function as Grignard reagents just as does $R_2Mg \cdot MgX_2$. "Grignard alkoxides," RMgOR', in which the halide of the Grignard reagent is replaced by the residue of an alcohol or phenol, have been prepared generally as unisolated intermediates or minor components in mixtures comprising the usual Grignard halides (cf. Chemistry and Industry, 1960 1533). Similar type compounds can be made from primary or secondary amines.

The Grignard reagent can exist in any one of several forms, depending on the presence of $MgX_2$ (with which $R_2Mg$ forms an adduct, as is shown in Equation 2 above) or an ether or tertiary amine (with which $R_2Mg$ forms solvates). Possible forms of Grignard reagents are therefore as follows: $R_2Mg$, $R_2Mg \cdot MgX_2$, $R_2Mg \cdot$solvate, $R_2Mg \cdot MgX_2 \cdot$solvate or polymeric forms thereof, e.g. dimers.

Quite surprisingly, we have discovered a novel class of optically active Grignard-type alkoxides and amines of the formula RMgZR', hereinafter defined. The R' substituent of our compounds is optically active and ordinarily is characterized by at least one asymmetric carbon atom. Our new Grignard-type compounds can exist in any of the following forms: RMgZR', RMgZR'·solvate, $$RMgZR' \cdot MgX_2$$
$$RMgZR' \cdot MgX_2 \cdot \text{solvate}$$
$$R_2Mg \cdot Mg(ZR')_2$$
$$R_2Mg \cdot Mg(ZR')_2 \cdot \text{solvate}$$
$$R_2Mg \cdot Mg(ZR')_2 \cdot MgX_2$$

and $$R_2Mg \cdot Mg(ZR')_2 \cdot MgX_2 \cdot \text{solvate}$$

The particular form in which the compounds of the invention are to be obtained depends upon the their intended use, as will be explained hereafter.

The new compounds exhibit remarkable utility as vinyl polymerization and condensation polymerization catalysts or co-catalysts and as reagents in the chemical asymmetric synthesis of optically active alcohols.

For polymerization catalysts or co-catalysts one can use our novel compounds in the form of optically active $R_2Mg(ZR')_2$, its $MgX_2$ adducts or its solvates, depending upon the desired reaction. Thus, halide-free, solvent-free $R_2Mg \cdot Mg(ZR')_2$ is the most effective for condensation polymerization and differs from conventional basic condensation catalysts in that it is solvent soluble. The major use in polymerization for our novel optically active reagents is in the stereospecific polymerization of vinyl monomers, for example, acrylates. The unsolvated or solvent-free form of our novel reagents is best for use in stereospecific polymerization.

Stereospecific polymerization of an optically active monomer results in the formation of an optically active polymer. Optical activity in a polymer results in a decrease of the entropy of the polymer; entropy in this case being the loss of energy caused by the random arrangement of atoms along the polymer chain. The conformation of a polymer by stereospecific synthesis results in a product having higher density and therefore improved stiffness, improved heat distortion properties, and a higher glass transition temperature. Stereospecific polymerization of an optically inactive monomer results in largely ordered polymerization to give an isotactic or syndiotactic polymer of improved properties.

The novel optically active reagents of the invention are also useful, particularly in the form of their halide adducts, in the asymmetric synthesis of optically active alcohols. According to Gilman, "Organic Chemistry" (2nd edition), vol. 1, p. 208, asymmetric syntheses are those processes for producing optically active compounds from symmetrically constituted molecules by the intermediate use of optically active reagents, but without the use of any of the methods of resolution. According to Gilman, all known asymmetric syntheses by chemical means are very inefficient, providing, at most, a 5 percent predominance of one optically active form over its racemate. The resolution of a racemic compound or mixture, indicated as *dl*-compound, into its optical antipodes (*d*-compound and *l*-compound) is generally a tedious and time-consuming task involving conversion to diastereoisomeric derivatives (e.g. the *dd*- and *ld*-salts of *dl*-acid with a *d*-base), separation of these into pure components by fractional crystallization and then conversion back to the desired pure isomer. Racemic tertiary alcohols are especially difficult to resolve, since their ease of dehydration makes derivatization practically impossible in some instances. Thus, in "The Resolution of Alcohols" chapter 9 of vol. II of Organic Reactions (R. Adams, ed., John Wiley and Sons, N.Y.C., 1944) A. W. Ingersoll lists 122 alcohols successfully resolved by standard procedures; only five of these are tertiary alcohols.

The production of optically active alcohols by reacting one of our novel Grignard-type reagents with an unsymmetrically-substituted ketone is described in our co-pending application S.N. 218,567, filed even date herewith. Because of the aforementioned difficulty in the resolution of a racemic mixture, an asymmetric synthesis, in which even a minor predominance of one enantiomorph is obtained during the course of what would normally be the synthesis of a *dl*-compound, is most advantageous.

Unexpectedly, our novel asymmetric synthesis provides a 20 percent predominance of one optically active form over its enantiomorph (e.g. *l*-content of product 60%, $d$-content of product 40%); a degree of optical purity approximately four times that normally achieved in chemical asymmetric synthesis. The novel synthesis is quite effective for the preparation of optically active tertiary alcohols, the resolution of which is particularly difficult, as noted hereabove.

Many of the optically active alcohols produced by the foregoing method are optically active pharmaceuticals or are convertible by known means to optically active pharmaceuticals. The use of the optically active alcohols as pharmaceutical intermediates is particularly significant, since many pharmaceuticals exhibit physiological activity only in one of their optically active forms. The foregoing synthesis of alcohols is very flexible; by use of either the $d$- or $l$-starting compound in the asymmetric synthesis, the final product will have the corresponding absolute configuration. Pharmaceutically useful optically active alcohols or derivatives thereof include trihexyphenidyl hydrochloride, useful in the treatment of Parkinson's disease; alphaprodine hydrochloride, a useful analgetic; tridihexethyl iodide, a parasympatholytic agent particularly recommended for use in treating gastro-intestinal spasms; propoxyphene hydrochloride, which in its $\alpha$-$d$ form, the most potent of two racemates and four stereoisomers, is sold as the analgesic Darvon; butamine hydrochloride, a commercial local anesthetic and $d$-desoxyephedrine hydrochloride, used in psychogenic disorders.

It is, therefore, an object of the present invention to provide novel optically active Grignard-type reagents useful as polymerization catalysts or co-catalysts and as reagents in the synthesis of optically active alcohols. It is a further object to provide a novel method for making these optically active reagents.

In accordance with the invention we have discovered compounds representable by the formula:

RMgZR'

In the above formula R is a hydrocarbon residue having from 1–28 carbon atoms. R' is an optically active hydrocarbon residue having from 4–28 carbon atoms, one of the carbon atoms ordinarily being asymmetric. Z can be either oxygen or NR'', wherein R'' is either R or R'. The term hydrocarbon residue, defined above by the number of carbon atoms that it includes, is intended to mean radicals made up of carbon and hydrogen only, free from reactive functional groups containing other types of atoms. Thus, the term R includes alkyl, e.g. methyl, ethyl, propyl, butyl, 2-ethylhexyl, dodecyl, 6-docosanyl, and the like; alkenyl, e.g. vinyl, isopropenyl, allyl, 1- and 2-buta-1,3-dienyl, 1- and 2-penta-2,3-dienyl, 2,2-dimethyl-but-3-enyl, 10-undecenyl, 9,12,15-octadecatrienyl, 12-tetracosenyl, and the like; alkinyl, e.g. 2-butinyl, 10-undecynyl, 13-octacosynyl, and the like; cycloalkyl, e.g. cyclohexyl, hexahydrobenzyl, 2,8-dimethylcyclooctyl, 6-t-octyldecahydronaphthyl-1-, 3-$\beta$-chloestanyl, perhydroabietyl, (perhydrofluoroenyl-9-)methyl, and the like; and cycloalkenyl, e.g. cyclopentadienyl, phenyl, p-ethylbenzyl, naphthyl, 13-(cyclopent-2-enyl)tridecyl, $\alpha$-cholesteryl, 9-fluorenyl, $\alpha$-styryl, benzhydryl, campesteryl, and the like. R' thus includes such optically active residues as $d$-menthyl, $l$-(2-cyclopentenylmethyl), $l$-(campesteryl, $d$-2-butyl, $d$-1-spiro-(4,5)dec - 6 - enyl, 1-2-phenylbutyl, $d$-3-(1,2-allenyl)-benzyl, 2,6-dimethyloctyl, $l$-4-limonenyl, and the like. It is obvious that R' must be free of groups that react with Grignards, e.g. C≡CH, and the like.

Illustrative novel compounds of the invention (prepared as described hereafter) in the various forms in which they may exist are shown below in Table I.

TABLE I

| Name | RZR'·MgX$_2$·solvate Components | | | |
|---|---|---|---|---|
| | R | ZR' | X | Solvate |
| Methylmagnesium-$d$-sec-butoxide. | CH$_3$— | —OCHC$_2$H$_5$-$d$ with CH$_3$ | | |
| Phenylmagnesium-$l$-iso-pulegoxide, magnesium bromide salt. | C$_6$H$_5$ | [isopulegoxide structure]-$l$ | Br | |
| Allylmagnesium $l$-cholesteroxide, tetrahydrofuranate. | CH$_2$=CHCH$_2$— | [cholesteroxide structure]-$l$ | | [tetrahydrofuran ring] |
| 4-Methoxycyclohexylmagnesium $l$-(p-anisylethylmethylaminide) magnesium chloride salt, ethyl etherate. | CH$_3$O—[cyclohexyl]— | $l$—N—CH—C$_6$H$_5$—OCH$_3$ with CH$_3$ | Cl | (C$_2$H$_5$)$_2$O |
| 2-Cyclopentenylmethylmagnesium $d$-2-methylbutoxide, magnesium bromide salt, pyridine solvate. | [cyclopentenyl]—CH$_2$— | $d$—OCH$_2$CC$_2$H$_5$ with CH$_3$ and H | Br | C$_5$H$_5$N |
| 2-Dimethylaminoethylmagnesium $l$-3-sec-amylphenoxide, halide free, butyl etherate. | CH$_3$\NC$_2$H$_4$ / CH$_3$ | O—[phenyl]— $l$—H$_3$C—C—C$_3$H$_7$-$n$ with H | | (n—C$_4$H$_9$)$_2$O |

The compounds of the invention are most conveniently prepared by a novel method involving reacting under anhydrous, oxygen-free conditions a compound representable by the formula:

$$R_2Mg \cdot MgX_2$$

wherein X is a halogen having an atomic weight of at leats 33 and R is as defined aforesaid, with a compound representable by the formula:

$$Mg(ZR')_2$$

wherein R' and Z are as defined aforesaid.

The novel process is based on an unexpected equilibrium reaction, contrary to the findings of Wotiz et al., illustrated by the following equation:

(5) $R_2Mg + MgX_2 + Mg(ZR')_2 \rightleftharpoons 2RMgZR' \cdot MgX_2$ $$\Updownarrow$$

$R_2Mg \cdot Mg(ZR')_2 \cdot MgX_2 \rightleftharpoons R_2Mg \cdot MgXZR' + MgXZR'$ The above reaction is further complicated by the presence of a Lewis base solvent, such as an ether or tertiary amine, since the resulting Grignard-type compound is obtained in the form of its solvate.

The normal Grignard, $R_2Mg \cdot MgX_2$, can be prepared by any of the known methods described in Kharasch and Reinmuth "Grignard Reactions of Non-Metallic Substances," pp. 1–114. The simplest method is to use the direct reaction RX+Mg, wherein R is the saturated or unsaturated hydrocarbon residue having 1–28 carbon atoms, described hereabove. The X of the organic halide RX must not be attached to a ternary carbon atom and can be either chlorine, bromine or iodine. It is preferable, but not necessary, that R not be optically active. The compound $R_2Mg \cdot MgX_2$ may be formed in situ by adding its components RX and Mg to the reaction mixture in substantially stoichiometric quantities.

The reactant, $Mg(ZR')_2$, can be made by the transesterification of $Mg(ZR'')_2$ with R'ZH wherein R, R'' and Z have the values given hereabove. It is also possible to prepare $Mg(ZR')_2$ directly by reacting magnesium with R'ZH, although this method is not too effective in some cases. The reaction of a metal alkyl or its hydride with R'ZH also gives the desired compound. This method is generally the best, but it is probably more expensive than either of the other two methods.

$Mg(ZR')_2$ can also be formed in situ by the reaction of $M(ZR')_m$ with a Grignard reagent as follows:

(6) $2M(ZR')_m + mR_2Mg \cdot MgX_2 \rightleftharpoons mR_2Mg \cdot Mg(ZR')_2 + 2MX_m$ In the above equation M is a metal of Groups IA, IIA or IIIA of the Periodic Table, Z and R' are as defined above and m is the valence of the metal.

The preparation of the novel Grignard-type compounds of the invention is conducted at a temperature ranging between —50° C. and 150° C. It is more costly, and therefore undesirable, to operate at temperatures below —50° C. and at temperatures somewhat above 100° C.– 150° C., there is considerable danger of destroying either the reaction or the product Grignard reagent.

The reaction is conveniently conducted at atmospheric pressure, no advantage being obtained by using lower pressures. Higher pressures may be advantageous in the preparation of RMgX from such volatile halides as methyl chloride or bromide.

The mole ratio of the reactants is not critical. For most purposes, it is best to use substantially stoichiometric quantities, although this is best determined by the use to which the product will be put. Thus, for asymmetric syntheses of alcohols from our novel products plus aldehydes, etc., a slight deficiency of $Mg(ZR')_2$ is generally less detrimental than a slight excess, while for use as condensation catalysts, the reverse is true. The nature of Z also affects this: the aminides (Z—NR'') are more basic then the oxides (Z=O).

As noted hereabove, the compounds of the invention can be prepared in any one of a number of forms, depending on whether the reaction is conducted in the presence or absence of a solvent and also depending on the work-up procedure. The reaction can be conducted in the absence of a solvent by drying milling $R_2Mg \cdot MgX$ and $Mg(ZR')_2$ in an anaerobic atmosphere. If a solvent is to be used in the reaction, it must be one which does not destroy or is inert to the Grignard reagent. Suitable solvents of this class include ethers, such as diethyl ether, di-n-propyl ether, di-n-butyl ether, tetrahydrofuran, Diglyme, and the like; and tertiary amines, such as triethylamine, trimethylamine, tri-n-butylamine, tri-n-propylamine, n-methylpiperidine, dimethylaniline, and the like. Both ethers and amines form solvates with the product.

The product can be obtained in its halide-free form by precipitating $MgX_2$ in dioxane. The unsolvated Grignard is obtained by evaporating solvated product under high vacuum for a long period of time. To obtain solvent-free $RMgZR' \cdot MgX_2$, it is easiest to add $Mg(ZR')_2$ to $R_2Mg \cdot MgX_2 \cdot$ solvate in solution and then evaporate dry under mild conditions. Solutions of $$R_2Mg(ZR')_2 \cdot MgX_2 \cdot \text{solvate}$$

can be made by reconstituting $R_2Mg$ or by adding $Mg(ZR')_2$ at any stage of the preparation of $$R_2Mg \cdot MgX_2 \cdot \text{solvate}.$$

The novel compounds of the invention can be made by an alternate method somewhat similar to the Zerewitinoff procedure for the determination of the active hydrogen content of an alcohol. The optically active alcohol or amine, R'ZH, is reacted under anhydrous, oxygen-free conditions with a normal Grignard, according to the following equation:

(7) $R'ZH + R_2Mg \cdot MgX_2 \rightleftharpoons RH + RMgZR' \cdot MgX_2$

This procedure is less desirable than the method according to the invention, described hereabove, because of the destruction of one-half of the carbon to magnesium bonds.

Suitable optically active alcohols and amines useful in the alternate method are menthol, neomenthol, isomenthol, carvomenthol, methylethylisopropyl carbinol, 3-methylcyclohexanol, α-methylbenzyl alcohol, thujyl alcohol, borneol, desoxyephedrine, methyl-2-butylamine, fenchyl alcohol, 2-methylmorpholine, and the like. The reaction is run using the same pressure, temperatures, mole ratios and work-up procedures described hereabove.

Our invention is further illustrated by the following examples:

*Example I*

Magnesium *l*-menthoxide, $Mg(OC_{10}H_{19}\text{-}l)_2$, was prepared by the reaction of clean, dry magnesium (12.1 g., 0.5 m.) with a stoichimeteric quantity of distilled *l*-methol (156.2 g., 1 m.) in 1,2-dimethoxyethane. The same product was obtained by transesterification of magnesium isopropoxide (14.2 g., 0.1 m.) with excess *l*-menthol (75 g.) at 95–100° C. Magnesium *l*-menthoxide was also made by the addition of a stoichiometric quantity of *l*-menthol (15.6 g., 0.1 m.) to be prepared and analyzed normal Grignard solution (ethylmagnesium bromide) in ether.

In each of the foregoing preparations, the magnesium *l*-menthoxide product was an amorphous, white solid. The three products showed the same specific rotation, $[\alpha]_D^{26} = 51.2 \pm 0.6°$, at the same concentration in ether. Each of the isolated products have on hydrolysis, extraction and isolation unracemized *l*-menthol, $$[\alpha]_D^{22} = -47.6 \pm 6°$$

This comparsion established the equivalence of the three methods of preparing the solutions without racemizing the menthol.

The pure magnesium *l*-menthoxide, 0.00512 mole, prepared as described hereabove, was reacted in ether with 25 ml. of 0.41 N ethylmagnesium bromide. The resulting product, representable as $$C_2H_5MgOC_{10}H_{19}\text{-}l \cdot MgBr_2 \cdot nEt_2O$$

in solution, had a specific rotation, based on the *l*-menthol content, of $[\alpha]_D = -49.6 \pm 1.0°$. Evaporation to dryness gave the theoretical weight of pyrophoric solvate, a yellowish solid.

Example II

Ethylmagnesium bromide was prepared in 70–89% yield by the slow addition in a dry nitrogen purged flask of 120 g. (1.1 moles) ethyl bromide to a cooled, well stirred slurry of 24 g. clean, dry magnesium in 1000 ml. dry peroxide-free ether, followed by filtration under positive nitrogen pressure. An aliquot of the solution thus obtained containing 0.40 equivalent of $(C_2H_5)Mg \cdot MgBr_2$ as its etherate was transferred under nitrogen to another flask. The Grignard was then slowly reacted at 15–20° C. with 31.25 g. (0.20 equivalents) pure *l*-menthol; $[\alpha]_D^{22} = 47.7°$. An exotherm developed immediately and ethane was evolved quantitatively from the reaction mixture. There resulted a clear, colorless solution containing 0.20 equivalent of ethylmagnesium *l*-menthoxide, $C_2H_5MgO \cdot C_{10}H_{19} \cdot nMgBr_2 \cdot$ etherate. The solution thus obtained is suitable for immediate use in the novel asymmetric synthesis of alcohols, illllustrated by Example XIII. For characterization, and especially for polymerization, it is desirable to prepare salt-free or solvent-free ethylmagnesium *l*-menthoxide.

Example III

The solution of Example II, containing the novel Grignard was distilled under nitrogen at low temperatures to remove most of the diethyl ether then under nitrogen pressure pumped for 24 hours at 0.5 mm. to remove all solvent and solvate liquid. There resulted a quantitative yield of ether-free ethylmagnesium *l*-menthoxide·MgBr₂, a pale yellow, microcrystalline solid, which was highly pyrophoric. In a sealed tube under nitrogen the crystals decomposed with gas evolution, rather than melting. The crystals were soluble, except for a trace, in dry heptane.

Example IV

To prepare salt-free ethylmagnesium *l*-menthoxide for use as a condensation catalyst, it is best to remove salt from $(C_2H_5)_2Mg \cdot MgBr_2 \cdot$ etherate. Normal Grignard bromide was prepared from 24 g. dry magnesium, 130 g. ethyl bromide and 1000 g. of ether. The mixture was treated with 115 g. (1.3 moles) of dry, peroxide-free dioxane in an equal volume of dry, peroxide-free ether. The resulting mixture was stirred for eight hours under nitrogen, then filtered free of precipitated salt. The addition to the filtrate of one mole of *l*-menthol per mole of diethyl magnesium at 10–15° C. gave a clear solution of the novel optically active Grignard, representable by either of the equilibrium (solvated) forms:

$$(C_2H_5)_2Mg \cdot Mg(OC_{10}H_{19}\text{-}l)_2 \rightleftharpoons 2C_2H_5MgOC_{10}H_{19}\text{-}l$$

The product was obtained in an amount corresponding to 63 percent of the theoretical yield. None of the bromide remained in solution. In this form, as its bromide-free solvate in dioxane, ethylmagnesium *l*-menthoxide is more effective as a condensation catalyst and co-catalyst in a free radical polymerization system (cf. Example XV), than in asymmetric synthesis or ionic polymerization catalyst systems.

The clear solution was distilled at slightly above room temperature to remove ether, then held at 70–80° C. at 1 mm. for 48 hours to remove dioxane. The solid product, representing 48 percent yield of active Grignard, was obtained as a dry, amorphous, pyrophoric, off-white solid, free of ether and dioxane and essentially free of bromide ion. In this form the product is a good condensation catalyst, but it is now most effective in ionic polymerization catalyst systems, giving good yields of optically active polymer. Visually, this product is practically identical with the dried Grignard alkoxides of Examples I and III.

The same product can be obtained by slurrying the solid ether-free magnesium bromide adduct of ethylmagnesium *l*-menthoxide with equimolar amounts of dry dioxane for four hours, followed by filtering and evaporating the filtrate down to dryness in vacuo.

Example V

The procedure of Example II was repeated with the exception that *dl*-menthol was substituted for the *l*-menthol used as a reactant. A visually identical product was obtained, but the product had no optical activity.

Example VI

A solution was made by slowly adding 12.9 g. pure *d*-2-octanol in 100 ml. diethyl ether at 15–20° C. with agitation to 100 ml. of 2.15 N ethylmagnesium bromide in ether. The resulting product gave the same specific rotation, based on 2-octanol, as did a solution prepared from magnesium *d*-2-octoxide and ethylmagnesium bromide. Both product Grignard-type compounds showed the same visual properties and achieved the same asymmetric induction with acetophenone.

Example VII

The procedure of Example VI was repeated using phenylmagnesium bromide in lieu of the ethylmagnesium bromide as the Grignard reagent. There was thus obtained as an unisolated product phenylmagnesium *d*-2-octoxide.

Example VIII

A solution of 30.25 g. *d*-desoxyephedrine and 30 ml. of di-n-butyl ether was slowly added to 400 ml. of di-n-butyl ether containing 0.406 mole of ethylmagnesium bromide. The resulting mixture was heated at 80° C. for 30 minutes. The product thus obtained was identical in its properties to one made by heating unisolated.

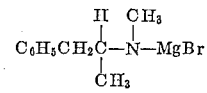

made from heating a 1:2 molar mixture of ethylmagnesium bromide and desoxyephedrine in refluxing dibutyl ether for thirty minutes.

Example IX

The procedure of Example VIII was repeated using methylmagnesium bromide as the Grignard reagent. There was thus obtained a Grignard-type compound having the formula:

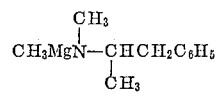

Example X

Methylmagnesium cholesteroxide was made in low yield from 200 ml. 1.5 N methylmagnesium iodide in ether and 58 g. of cholesterol in 600 ml. ether. The product appeared as a viscous inhomogeneous semi-solid.

Example XI

A solution of phenylmagnesium chloride was made in 43 percent yield by refluxing a stirred suspension of 5 g. magnesium metal and a catalytic amount of ethyl iodide in 500 ml. of purified chlorobenzene for 48 hours under dry nitrogen. An aliquot of the filtrate containing 0.4 g. of $(C_6H_5)_2Mg \cdot MgCl_2$ was transferred anaerobically to a smaller flask and stirred at 20–25° C. under dry nitrogen while being treated over a period of 25 minutes with a solution of 0.625 (slightly less than one mole of alcohol per mole of Grignard) $\alpha$-*d*-tocopherol in 15 ml. of chlorobenzene. The reaction mixture was stirred at 60–70° C. for one-half hour and then taken to dryness in vacuo.

The weight of the residue was approximately that theoretically required for the monosolvate:

$$C_6H_5MgOC_{29}H_{49}O \cdot MgCl_2 \cdot C_6H_5Cl$$

The thick, brown, oily phenylmagnesium-*d*-α-tocopheroxide in benzene had an optical rotation of −0.86°.

*Example XII*

To stirred dried magnesium, 12 g., there was slowly added under nitrogen at room temperature 66.3 g. pure benzyl chloride in 70 ml. diethyl ether. The Grignard reagent precipitated as formed as a white, amorphous solid. An additional 200 ml. of diethyl ether was added and the stirring was continued while a solution of 37.4 g. *l*-borneol in 100 ml. of ether was added over a three hour period. The exotherm resulting from the addition of the *l*-borneol required the use of a water bath. An aliquot of this suspension, corresponding to calculated 1.5 g. benzylmagnesium-*l*-borneoxide was transferred anaerobically to another flask. It was evaporated dry at about 5 mm. of Hg and 20–30° C. to give a white, amorphous pyrophoric polyetherate. The product was soluble in peroxide-free dioxane. After being filtered free of precipitated magnesium chloride, the halide-free off-white solution had an optical rotation of −13.8°. On calculated borneol content this rotation is about the same as a dioxane solution obtained on dissolving the evaporated residue of a benzylmagnesium-*l*-borneoxide was transferred anaerobically to ether.

*Example XIII*

Ethylmagnesium bromide, prepared in 75.2% yield from 60 g. ethyl bromide and 12 g. dry magnesium in 250 ml. of ether, was treated slowly at 30° C. with 28.75 g. [0.185 mole, 1 equivalent per equivalent of $$(C_2H_5)Mg \cdot MgBr_2]$$

pure *l*-methol in 200 ml. of ether. The reaction mixture was stirred for 30 minutes. After the addition of *l*-methol, there was thereafter added 20 g. distilled methylisobutyl ketone in 150 ml. of ether. The mixture was allowed to react and then hydrolyzed with a saturated aqueous ammonium chloride solution. The dry ether layer was stripped off and the product was distilled to give 67 percent of the theoretical yield of pure methylisobutylcarbinol (3,5-dimethyl-3-hexanol, B.P. 55.8–56.1 at 15 mm.). The product was purified by vapor-phase chromatography and refractionation at both reduced pressure (B.P. 56.3–56.6 at 15 mm.) and again at atmospheric pressure (B.P. 152° C., literature reports 152–153° C.). The specific rotation of the pure product $[\alpha]_D^{22} = 0.45°$, corresponding to 83 percent *dl*-carbinol and 17 percent *l*-carbinol. Distillation of the residues gave additional amounts of product having about the same specific rotation. Infrared spectra and vapor phase chromatography of product cuts showed complete absence of ketones, olefins or *l*-menthol.

*Example XIV*

Sodium-*l*-menthoxide was prepared in heptane from 4.2 g. sodium and 25 g. *l*-menthol. When the reaction ceased, the mixture was filtered free of excess sodium to give, by titration, a 0.6 N solution representing a quantitative yield of sodium-*l*-menthoxide, $[\alpha]_D = 14.5 \pm 0.3°$, specific rotation. During this time, cyclohexylmagnesium bromide was made from ½ mole magnesium and ½ mole distilled cyclohexylbromide in diethyl ether. After clarifying, the solution was evaporated down and thereafter held for three days at 0.5–3 mm. of Hg and 30–32° C. until no more loss of weight was observed. Titration showed a 62 percent yield of $(C_6H_{11})Mg \cdot MgBr_2$. The Grignard was taken up in toluene to give an 0.2 molar solution. The two solutions were mixed in stoichometric quantities (2 moles of alkoxide to one mole of Grignard) and stirred for two hours at room temperature. The reaction mixture was clarified free of sodium to give a clear, light brown solution of $$(C_6H_{11})_2Mg \cdot Mg(l\text{-}OC_{10}H_{19})_2$$

representing an 84 percent yield based on the amount of sodium bromide precipitated.

*Example XV*

At 25–30° C. the toluene solution of the product of Example XIV, containing 0.1 g. of Grignard menthoxide, was diluted with toluene to 200 ml. It was then treated dropwise with 0.2 g. titanium tetrachloride in 100 ml. of toluene, and stirred one-half hour at room temperature. There was then added dropwise over a 30 minute period 50 ml. distilled methylmethacrylate. The resulting polymerization mixture was stirred at 25–30° C. for eight hours and filtered under anaerobic conditions. The polymeric product was washed well with toluene to give a crystalline polymethylmethacrylate, very slightly levorotary.

We claim:
1. A compound representable by the formula:

$$RMgZR'$$

wherein R is a hydrocarbon residue selected from the group consisting of alkyl, alkenyl, alkinyl, cycloalkyl and cycloalkenyl having from 1–28 carbon atoms; R' is an optically active hydrocarbon residue selected from the group consisting of alkyl, alkenyl, alkinyl, cycloalkyl and cycloalkenyl having from 4–28 carbon atoms, at least one of said carbon atoms being asymmetric; and Z is a member selected from the group consisting of —O— and —N—R'', wherein R'' is a member selected from the group consisting of R and R'.

2. A halide-associated compound representable by the formula:

$$RMgZR'$$

wherein R is a hydrocarbon residue selected from the group consisting of alkyl, alkenyl, alkinyl, cycloalkyl and cycloalkenyl having from 1–28 carbon atoms; R' is an optically active hydrocarbon residue selected from the group consisting of alkyl, alkenyl, alkinyl, cycloalkyl and cycloalkenyl having from 4–28 carbon atoms, at least one of said carbon atoms being asymmetric; and Z is a member selected from the group consisting of —O— and —N—R'', wherein R'' is a member selected from the group consisting of R and R'.

3. A halide-associated, solvated compound representable by the formula:

$$RMgZR'$$

wherein R is a hydrocarbon residue selected from the group consisting of alkyl, alkenyl, alkinyl, cycloalkyl and cycloalkenyl having from 1–28 carbon atoms; R' is an optically active hydrocarbon residue selected from the group consisting of alkyl, alkenyl, alkinyl, cycloalkyl and cycloalkenyl having from 4–28 carbon atoms, at least one of said carbon atoms being asymmetric; and Z is a member selected from the group consisting of —O— and —N—R'', wherein R'' is a member selected from the group consisting of R and R'.

4. Ethylmagnesium-*l*-menthoxide.
5. Magnesium bromide-associated ethylmagnesium-v-menthoxide.
6. Magnesium bromide-associated, diethyl ether-solvated ethylmagnesium-*l*-menthoxide.
7. Magnesium bromide-associated diethyl ether-solvated phenylmagnesium-*l*-2-octoxide.
8. Magnesium bromide-associated diethyl ether-solvated methylmagnesium cholesteroxide.
9. Magnesium bromide-associated diethyl ether-solvated methylmagnesium desoxyephedride.
10. Magnesium bromide-associated diethyl ether-solvated phenylmagnesium-*l*-borneoxide.
11. Magnesium chloride-associated, chlorobenzene-solvated phenylmagnesium-α-*d*-tocopheroxide.

12. Method of making a compound representable by the formula:

RMgZR′ wherein R is a hydrocarbon residue selected from the group consisting of alkyl, alkenyl, alkinyl, cycloalkyl and cycloalkenyl having from 1–28 carbon atoms; R′ is an optically active hydrocarbon residue selected from the group consisting of alkyl, alkenyl, alkinyl, cycloalkyl and cycloalkenyl having from 4–28 carbon atoms, at least one of said carbon atoms being asymmetric; and Z is a member selected from the group consisting of —O— and —N—R″, wherein R″ is a member selected from the group consisting of R and R′, comprising reacting under anhydrous oxygen-free conditions a compound representable by the formula:

R₂Mg·MgX₂ wherein X is a halogen having an atomic weight of at least 33 and R is as defined aforesaid, with a compound representable by the formula:

Mg(ZR′)₂ wherein R′ and Z are as defined aforesaid.

13. Method according to claim 12 wherein the reaction is conducted in the presence of a solvent which does not destroy the reactants.

14. Method according to claim 13 wherein said solvent is an ether.

References Cited in the file of this patent
UNITED STATES PATENTS 2,255,072    Marker _____ Sept. 9, 1941
2,255,073    Marker _____ Sept. 9, 1941

UNITED STATES PATENT OFFICE
CERTIFICATE OF CORRECTION

June 30, 1964

Patent No. 3,139,442

Bernard Rudner et al.

It is hereby certified that error appears in the above numbered patent requiring correction and that the said Letters Patent should read as corrected below.

Column 2, line 10, for "$R_2Mg(ZR')_2$" read -- $R_2Mg \cdot Mg(ZR')_2$ --; column 6, line 55, for "methol" read -- menthol --; column 7, line 38, for "sold" read -- solid --; column 10, line 62, for "ethylmagnesium-v-" read -- ethylmagnesium-1- --.

Signed and sealed this 20th day of July 1965.

(SEAL)
Attest:

ERNEST W. SWIDER
Attesting Officer

EDWARD J. BRENNER
Commissioner of Patents